United States Patent
Niu et al.

(10) Patent No.: US 7,070,753 B2
(45) Date of Patent: *Jul. 4, 2006

(54) MODIFICATION OF NANOTUBES OXIDATION WITH PEROXYGEN COMPOUNDS

(75) Inventors: Chunming Niu, Lexington, MA (US); David Moy, Germantown, MD (US); Jun Ma, Quincy, MA (US); Asif Chishti, Lowell, MA (US)

(73) Assignee: Hyperion Catalysis International, Inc., Cambridge, MA (US)

( * ) Notice: Subject to any disclaimer, the term of this patent is extended or adjusted under 35 U.S.C. 154(b) by 451 days.

This patent is subject to a terminal disclaimer.

(21) Appl. No.: 10/150,370

(22) Filed: May 17, 2002

(65) Prior Publication Data

US 2003/0086858 A1    May 8, 2003

Related U.S. Application Data

(63) Continuation-in-part of application No. 09/861,370, filed on May 18, 2001, now Pat. No. 6,872,681.

(51) Int. Cl.
*D01F 9/12* (2006.01)

(52) U.S. Cl. ............... 423/447.1; 423/460; 977/DIG. 1

(58) Field of Classification Search ............. 423/447.1, 423/460; 977/DIG. 1
See application file for complete search history.

(56) References Cited

U.S. PATENT DOCUMENTS 5,641,466 A * 6/1997 Ebbesen et al. ......... 423/447.2

OTHER PUBLICATIONS

Endo et al., 'The Production and structure of Pyrolytic Carbon Nanotubes (PCNTs)' in J. Phys. Chem. Solids, vol. 54 #12 pp. 1841-1848 1993.*

* cited by examiner

*Primary Examiner*—Stuart Hendrickson
(74) *Attorney, Agent, or Firm*—Kramer Levin Naftalis & Frankel LLP; Barry Evans, Esq.

(57) ABSTRACT

A method of chemically modifying carbon nanotubes having a diameter less than one micron comprising: contacting the nanotubes with a peroxygen compound selected from the group consisting of organic peroxyacids, inorganic peroxoacids and organic hydroperoxides, or a salt thereof, under oxidation conditions and thereby producing modified carbon nanotubes. Oxidation of the nanotubes increases the degree of dispersion of aggregates of nanotubes and aids in the disassembling of such aggregates. The dispersed nanotubes are used to prepare rigid structures and can be used in electrodes and capacitors.

9 Claims, 1 Drawing Sheet

FIG 1
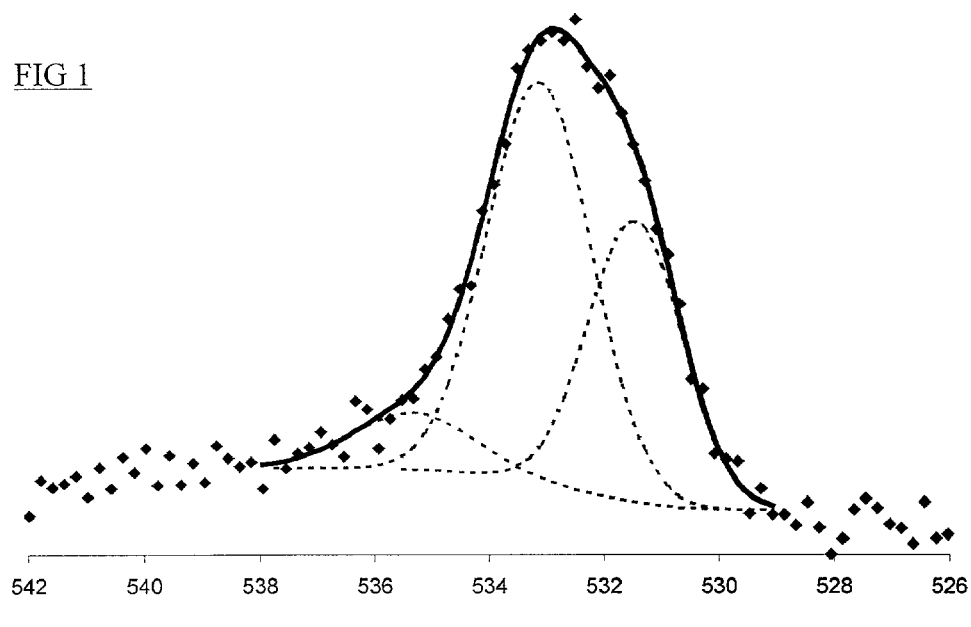
Binding Energy (eV)
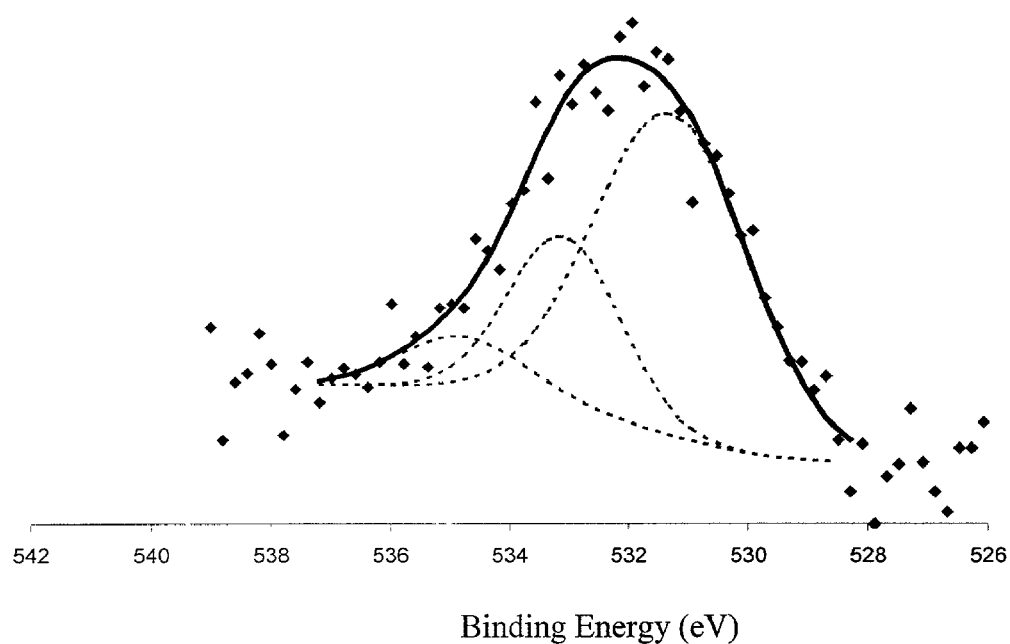
Binding Energy (eV)
FIG 2

MODIFICATION OF NANOTUBES OXIDATION WITH PEROXYGEN COMPOUNDS

RELATED APPLICATIONS

This application is a continuation-in-part of parent U.S. Ser. No. 09/861,370, filed May 18, 2001 now U.S. Pat. No. 6,872,681, hereby incorporated by reference.

The invention relates to the oxidative surface modification of carbon nanotubes. The nanotubes, which are in the form of discrete nanotubes, or, in an aggregate form such as combed yarn ("CY"), birds nest ("BN"), open net ("ON") or cotton candy ("CC"), are advantageously treated in their as-synthesized state. After treatment of the aggregate form, the aggregates can be more easily disassembled. The modified nanotubes can be used for many different applications including forming complex structures.

BACKGROUND OF THE INVENTION

Carbon Nanotubes

The invention lies in the field of submicron, graphitic, carbon fibrils, sometimes called vapor grown carbon fibers or nanotubes. Carbon fibrils are vermicular carbon deposits having diameters less than $1.0\mu$, preferably less than $0.5\mu$, and even more preferably less than $0.2\mu$. They exist in a variety of forms and have been prepared through the catalytic decomposition of various carbon-containing gases at metal surfaces. Such vermicular carbon deposits have been observed almost since the advent of electron microscopy. (Baker and Harris, *Chemistry and Physics of Carbon*, Walker and Thrower ed., Vol. 14, 1978, p. 83; Rodriguez, N., *J. Mater Research*, Vol. 8, p. 3233 (1993)).

In 1976, Endo et al. (see Obelin, A. and Endo, M., *J. of Crystal Growth*, Vol. 32 (1976), pp. 335–349) elucidated the basic mechanism by which such carbon fibrils grow. They were seen to originate from a metal catalyst particle. In the presence of that catalyst, a hydrocarbon containing gas decomposes, the catalyst particle becomes supersaturated in carbon and a cylindrical ordered graphitic core is extruded which immediately, according to Endo et al., becomes coated with an outer layer of pyrolytically deposited graphite. These fibrils with a pyrolytic overcoat typically have diameters in excess of $0.1\mu$, more typically 0.2 to $0.5\mu$.

Tennent, U.S. Pat. No. 4,663,230, hereby incorporated by reference, describes carbon fibrils that are free of a continuous thermal carbon overcoat and have multiple ordered graphitic outer layers that are substantially parallel to the fibril axis. As such they may be characterized as having their c-axes, the axes which are perpendicular to the tangents of the curved layers of graphite, substantially perpendicular to the cylindrical axes. They generally have diameters no greater than $0.1\mu$ and length to diameter ratios of at least 5. Desirably they are substantially free of a continuous thermal carbon overcoat, i.e., pyrolytically deposited carbon resulting from thermal cracking of the gas feed used to prepare them. The Tennent invention provided access to smaller diameter fibrils, typically 3.5 to 70 nm (35 to 700 Angstroms) having an ordered, "as grown" graphitic surface. Fibrillar carbons of less perfect structure, but also without a pyrolytic carbon outer layer have also been grown.

Tennent et al., U.S. Pat. No. 5,171,560, hereby incorporated by reference, describes carbon fibrils free of thermal overcoat and having graphitic layers substantially parallel to the fibril axes such that the projection of said layers on said fibril axes extends for a distance of at least two fibril diameters. Typically, such fibrils are substantially cylindrical, graphitic nanotubes of substantially constant diameter and comprise cylindrical graphitic sheets whose c-axes are substantially perpendicular to their cylindrical axis. They are multiwalled, are substantially free of pyrolytically deposited carbon, have a diameter less than $0.1\mu$ and a length to diameter ratio of greater than 5. These fibrils are of primary interest in the invention.

When the projection of the graphitic layers on the nanotube axis extends for a distance of less than two nanotube diameters, the carbon planes of the graphitic nanotube, in cross section, take on a herring bone appearance. These are sometimes termed fishbone fibrils. Fishbone fibrils are preferably between 5 and 200 nm in diameter and preferably between 10 and 100 nm in diameter. Aspect ratios are preferably between 5 and 1000 to 1 and more preferably between 10 and 100 to one. Geus, U.S. Pat. No. 4,855,091, hereby incorporated by reference, provides a procedure for preparation of fishbone fibrils substantially free of a pyrolytic overcoat. These carbon nanotubes are also useful in the practice of the invention.

Carbon nanotubes of morphology similar to the catalytically grown fibrils or nanotubes described above have been grown in a high temperature carbon arc (Iijima, Nature 354 56 1991). It is now generally accepted (Weaver, Science 265 1994) that these arc-grown nanofibers have the same morphology as the earlier catalytically grown fibrils of Tennent. Arc grown carbon nanofibers, colloquially referred to as "buckytubes" are also useful in the invention.

The carbon nanotubes which can be modified according to this application, are distinguishable from commercially available continuous carbon fibers. In contrast to these fibers which have aspect ratios (L/D) of at least $10^4$ and often $10^6$ or more, carbon nanotubes have desirably large, but unavoidably finite aspect ratios. The diameter of continuous fibers is also far larger than that of nanotubes, being always greater than one micron and typically 5 to 7 microns.

Continuous carbon fibers are made by the pyrolysis of organic precursor fibers, usually rayon, polyacrylonitrile (PAN) and pitch. Thus, they may include heteroatoms within their structure. The graphitic nature of "as made" continuous carbon fibers varies, but they may be subjected to a subsequent graphitization step. Differences in degree of graphitization, orientation and crystallinity of graphite planes, if they are present, the potential presence of heteroatoms and even the absolute difference in substrate diameter make experience with continuous fibers poor predictors of nanofiber chemistry.

Carbon nanotubes differ physically and chemically from the continuous carbon fibers which are commercially available as reinforcement materials, and from other forms of carbon such as standard graphite and carbon black. Standard graphite, because of its structure, can undergo oxidation to almost complete saturation. Moreover, carbon black is amorphous carbon generally in the form of spheroidal particles having a graphene structure, carbon layers around a disordered nucleus. The differences in graphite and carbon black also make them poor predictors of nanofiber chemistry. Oxidation of carbon black or graphite to make activated carbon is performed primarily to increase surface area and porosity, and results in a very high micropore distribution. Oxidations described here do not affect porosity and do not produce microporous materials.

Aggregates of Carbon Nanotubes and Assemblages

As produced carbon nanotubes may be in form of discrete nanotubes, aggregates of nanotubes or both.

Nanotubes are prepared as aggregates having various macroscopic morphologies (as determined by scanning electron microscopy) in which they are randomly entangled with each other to form entangled balls of nanotubes. They may resemble bird nests ("BN"), or as aggregates consisting of bundles of straight to slightly bent or kinked carbon nanotubes having substantially the same relative orientation, they may appear like combed yarn ("CY"), e.g. the longitudinal axis of each nanotube (despite individual bends or kinks) extends in the same direction as that of the surrounding nanotubes in the bundles. Alternatively the aggregates may consist of straight to slightly bent or kinked nanotubes which are loosely entangled with each other to form an "open net" ("ON") structure. In open net structures the extent of nanotube entanglement is greater than observed in combed yarn aggregates (in which the individual nanotubes have substantially the same relative orientation) but is less than that of bird nest aggregates.

The morphology of the aggregate is controlled by the choice of catalyst support used in the synthesis of the nanotubes. Spherical supports grow nanotubes in all directions leading to the formation of bird nest aggregates. Combed yarn and open net aggregates are prepared using supports having one or more readily cleavable planar surfaces, e.g., an iron or iron-containing metal catalyst particle deposited on a support material, e.g. $Al_2O_3$ or MgO, having one or more readily cleavable surfaces and a surface area of at least 1 square meter per gram. Moy et al., U.S. Pat. Nos. 5,456,897, 6,358,878, 5,726,116 and 6,143,689, herein incorporated by reference, describe nanotubes prepared as aggregates having various morphologies.

Further details regarding the formation of carbon nanotube or nanofiber aggregates may be found in the disclosures of Tennent, U.S. Pat. No. 5,165,909; Moy et al., U.S. Pat. No. 5,456,897; Snyder et al., U.S. Pat. No. 5,877,110; Moy et al., U.S. Pat. No. 5,456,897; Mandeville et al., U.S. Pat. No. 5,500,200; Bening et al., U.S. application Ser. No. 08/329,774 filed Oct. 27, 1994; and Moy et al., U.S. Pat. No. 5,569,635, all of which are assigned to Hyperion Catalysis International and are hereby incorporated by reference.

Nanotube mats or assemblages have been prepared by dispersing nanofibers, e.g. nanofibers made by the methods of Moy et al, U.S. Pat. Nos. 5,456,897, 6,358,878 and 5,726,116 in aqueous or organic mediums and then filtering the nanofibers to form a mat. The mats have also been prepared by forming a gel or paste of nanofibers in a fluid, e.g., an organic solvent such as propane, and then heating the gel or paste to a temperature above the critical temperature of the medium, removing the supercritical fluid and finally removing the resultant porous mat or plug from the vessel in which the process has been carried out. See, Tennent, et al., U.S. Pat. No. 5,691,054 entitled "Three-Dimensional Macroscopic Assemblages of Randomly Oriented Carbon Fibrils and Composites Containing Same", hereby incorporated by reference.

Oxidation of Nanotubes

Carbon nanotubes have been oxidized by treatment with strong acids such as concentrated nitric acid and sulfuric acid. U.S. Pat. No. 5,861,454 discloses the oxidation of fibrils with concentrated nitric acid resulting in a mass which was difficult to disperse. Hoogenvaad, M. S., et al., "Metal catalysts supported on a Novel Carbon Support", presented at Sixth International Conference on Scientific Basis for the Preparation of Heterogeneous Catalysts, Brussels, Belgium, September 1994, also found it beneficial in the preparation of fibril-supported precious metals to first oxidize the fibril surface with nitric acid. Such pretreatment with acid is a standard step in the preparation of carbon-supported noble metal catalysts, where, given the usual sources of such carbon, it serves as much to clean the surface of undesirable materials as to functionalize it.

Hiura and Ebbesen, in U.S. Pat. No. 5,698,175, describe a process for purifying and functionalizing carbon nanotubes which after synthesis contain carbon impurities such as carbon nanoparticles and amorphous carbons. In this process, the nanotubes are dispersed with ultrasound into nitric acid, chlorosulfonic acid or potassium permanganate in dilute sulfuric acid solution and heated to purify the nanotubes or introduce functional groups into the nanotubes.

McCarthy et al., U.S. patent application Ser. No. 351,967 filed May 15, 1989, hereby incorporated by reference, describes processes for oxidizing the surface of carbon nanotubes that include contacting the nanotubes with an oxidizing agent that includes sulfuric acid ($H_2SO_4$) and potassium chlorate ($KClO_3$) under reaction conditions (e.g., time, temperature, and pressure) sufficient to oxidize the surface of the fibril.

McCarthy and Bening, Polymer Preprints ACS Div. of Polymer Chem. 30 (1): 420(1990) prepared derivatives of oxidized nanotubes or fibrils in order to demonstrate that the surface comprised a variety of oxidized groups. The compounds they prepared, phenlhydrazones, haloaromaticesters, thallous salts, etc., were selected because of their analytical utility, being, for example, brightly colored, or exhibiting some other strong and easily identified and differentiated signal. These compounds were not isolated and are, unlike the derivatives described herein, of no practical significance.

Fisher et al., U.S. patent application Ser. No. 08/352,400 filed Dec. 8, 1994, Fisher et al, U.S. patent application Ser. No. 08/812,856 filed Mar. 6, 1997, Tennent et al., U.S. Pat. No. 6,031,711, Tennent et al., U.S. Pat. No. 6,099,960, and Tennent et al., U.S. Pat. No. 6,099,965, all hereby incorporated by reference, describe processes for oxidizing the surface of carbon fibrils that include contacting the fibrils with a strong oxidizing agent such as a solution of alkali metal chlorate in strong acid such as sulfuric acid.

Tennent et al., U.S. Pat. No. 6,099,695, describes lightly oxidizing nanofiber aggregates with hydrogen peroxide. These oxidized aggregates still disperse as aggregates.

Niu, et al., U.S. patent applications Ser. Nos. 09/358,745 and 09/358,747, commonly owned, describe vapor phase methods for oxidizing carbon nanotubes.

Niu et al., *Appl. Phys. Lett.* 70(11): 1480–1482 (1997), hereby incorporated by reference, describe the preparation of sheet electrodes. In this preparation, nanotube aggregates are first disassembled by treating with nitric acid.

U.S. Pat. No. 5,853,877 to Shibuta describes forming transparent electrically conductive films. Hollow carbon microfibers are treated with strong acid such as sulfuric acid or oleum plus and oxidizing agent which can be nitric acid or nitrate, permanganate, chromic acid, chromate, ozene, hydrogen peroxide or lead dioxide. The microfibers disentangle through this treatment.

Esumi et al., *Carbon* 34: 279–281 (1996) also treat carbon nanotubes with strong acid, i.e., concentrated nitric acid alone or combined with concentrated sulfuric acid to disperse the nanotubes to individual fibers.

The use of strong acid such as nitric acid and sulfuric acid leads to corrosion problems.

Functionalized Nanotubes

Functionalized nanotubes have been generally discussed in Fisher et al., U.S. patent application Ser. No. 08/352,400 filed Dec. 8, 1994. The nanotube surfaces are first oxidized by the methods referred to above. The oxidized nanotube surfaces are then modified with a spectrum of functional groups so that the nanotubes can be chemically reacted or physically bonded to chemical groups in a variety of reagents. Complex structures of nanotubes have been obtained by linking functional groups on the nanotubes with one another by a range of linker chemistries.

Representative functionalized nanotubes have the formula

$[C_nH_L]$—$R_m$ where n is an integer, L is a number less than 0.1 n, m is a number less than 0.5 n, each of R is the same and is selected from $SO_3H$, COOH, $NH_2$, OH, O, CHO, CN, COCl, halide, COSH, SH, R', COOR', SR', $SiR'_3$, $Si$—$(OR'$—$)_yR'_{3-y}$, $Si$—$(O$—$SiR'_2$—$)$—$OR'$, R'', Li, $AlR'_2$, Hg—X, $TlZ_2$ and Mg—X, y is an integer equal to or less than 3, R' is alkyl, aryl, heteroaryl, cycloalkyl aralkyl or heteroaralkyl, R'' is fluoroalkyl, fluoroaryl, fluorocycloalkyl, fluoroaralkyl or cycloaryl, X is halide, and Z is carboxylate or trifluoroacetate.

The carbon atoms, $C_n$, are surface carbons of the nanofiber.

There are drawbacks associated with the methods now available to provide oxidized carbon nanotubes. For example, one disadvantage of using strong acid treatment is the generation of environmentally harmful wastes. Treating such wastes increases the cost of the products in which oxidized nanotubes can be used, such as electrodes and capacitors. It would therefore be desirable to provide methods of oxidizing carbon nanotubes which do not use or generate environmentally hazardous chemicals and which can be scaled up easily and inexpensively.

While many uses have been found for carbon nanotubes and aggregates of carbon nanotubes, as described in the patents and patent applications referred to above, many different and important uses may still be developed if the nanotubes surfaces can be easily and inexpensively oxidized. Oxidation permits interaction of the oxidized nanotubes with various substrates to form unique compositions of matter with unique properties and permits structures of carbon nanotubes to be created through linkages between the functional sites on the surfaces of the nanotubes.

OBJECTS OF THE INVENTION

It is therefore an object of the invention to provide a method for oxidizing the surfaces of carbon nanotubes in nanotube aggregates to thereby modify the morphology of the aggregates.

It is a further object of the invention to provide a method for disassembling aggregates of carbon nanotubes by oxidizing the surfaces of the nanotubes.

It is still a further object of the invention to provide a method of functionalizing the surfaces of carbon nanotubes by both oxidizing them and also reacting them with other chemical media.

It is yet another object of the invention to provide a method of modifying the surfaces of carbon nanotubes by oxidation followed by cross-linking.

It is another object of the invention to provide a method of preparing rigid porous carbon structures using nanotubes oxidized according to the invention.

It is another object of the invention to provide methods of making nanotube-based electrodes and capacitors using nanotubes oxidized according to the invention.

SUMMARY OF THE INVENTION

The invention provides methods of oxidizing carbon nanotubes by contacting the nanotubes with a peroxygen compound-containing composition comprising organic peroxyacid, inorganic peroxoacid, hydroperoxide, or salt thereof, to produce carbon nanotubes which are modified by surface oxidation. The peroxygen compounds include inorganic peroxoacids, peroxycarboxylic acids of the formula $Q(C(O)OOH)_n$, hydroperoxides of the formula $Q(OOH)_n$, salts thereof, and combinations of any of the above, where Q is an alkyl, aralkyl, cycloalklyl, aryl or heterocyclic group of $C_1$ to $C_{12}$ and n is one or two. The oxidized nanotubes prepared according to the invention include carbon and oxygen containing moieties, such as carbonyl, carboxyl, aldehyde, ketone, hydroxy, phenolic, esters, lactones, quinones and derivatives thereof.

The invention also includes a method of treating nanotubes so that an aggregate of nanotubes can be disassembled comprising contacting the nanotube aggregate with a composition comprising peroxygen compound including organic peroxyacid, inorganic peroxoacid, hydroperoxide, hydrogen peroxide, or salt of any of these, under surface oxidizing conditions sufficient to allow surface oxidation and subsequent disassembly of the aggregates.

The invention also includes a method of treating nanotubes by contacting the nanotubes with a composition comprising hydrogen peroxide and a catalyst such as a metal oxide under conditions sufficient to oxidize the surface of the nanotubes.

The methods of the invention result in increased oxygen content of the nanotubes. The increased oxygen content may be measured directly or indirectly by measuring the acid titer of the oxidized nanotubes.

The carbon nanotubes oxidized according to the invention can be subjected to a secondary treatment in which the oxygen-containing moieties of the oxidized nanotubes react with suitable reactants to add at least one secondary group to the surface of the nanotubes. The nanotubes can also be crosslinked.

The carbon nanotubes oxidized according to the invention are useful in preparing networks of carbon nanotubes, or rigid, porous structures or as a starting material for electrodes used in electrochemical capacitors.

Other improvements which the present invention provides over the prior art will be identified as a result of the following description which sets forth preferred embodiments of the invention.

DETAILED DESCRIPTION OF THE INVENTION

Definitions

The terms "nanotube", "nanofiber" and "fibril" are used interchangeably. Each refers to an elongated hollow structure having a cross section (e.g., angular fibers having edges)

or a diameter (e.g., rounded) less than 1 micron. The term "nanotube" also includes "bucky tubes" and fishbone fibrils.

The term "functional group" refers to groups of atoms that give the compound or substance to which they are linked characteristic chemical and physical properties.

A "functionalized" surface refers to a carbon surface on which chemical groups are adsorbed or chemically attached.

"Graphitic" carbon consists of layers which are essentially parallel to one another and no more than 3.6 angstroms apart.

The term "aggregate" refers to a dense, microscopic particulate structure comprising entangled nanotubes.

The term "assemblage" refers to structures having relatively or substantially uniform physical properties along at least one dimensional axis and desirably have relatively or substantially uniform physical properties in that plane. The assemblage may comprise uniformly dispersed, individual interconnected nanotubes or a mass of connected aggregates of nanotubes. In other embodiments, the entire assemblage is relatively or substantially isotropic with respect to one or more of its physical properties. The physical properties which can be easily measured and by which uniformity or isotropy are determined include resistivity and optical density.

The term "micropore" refers to a pore which has a diameter of less than 2 nanometers.

The term "mesopore" refers to pores having a cross section greater than 2 nanometers and less than 50 nanometers.

The term "surface area" refers to the total surface area of a substance measurable by the BET technique.

The term "accessible surface area" refers to that surface area not attributed to micropores.

The term "isotropic" means that all measurements of a physical property within a plane or volume of the structure, independent of the direction of measurement, are of a constant value. It is understood that measurements of such non-solid compositions must be taken on a representative sample of the structure so that the average of the void spaces is taken into account.

The term "physical property" means an inherent, measurable property, e.g., surface area, resistivity, fluid flow characteristics, density, porosity, and the like.

The term "loose bundles" refers to the microscopic appearance of nanotubes oxidized according to the invention. Treated aggregates can substantially retain the macroscopic morphology of the untreated aggregates, yet microscopically, the structure displays many more loose nanotube ends than the untreated aggregate leading to an appearance similar to that of weathered rope.

The term "relatively" means that ninety-five percent of the values of the physical property when measured along the axis of, or within a plane of or within a volume of the structure, as the case may be, will be within plus or minus 20 percent of a mean value.

The term "substantially" or predominantly means that ninety-five percent of the values of the physical property when measured along an axis of, or within a plane of or within a volume of the structure, as the case may be, will be within plus or minus ten percent of a mean value.

The terms "substantially isotropic" or "relatively isotropic" correspond to the ranges of variability in the values of physical properties set forth above.

THE DRAWINGS

FIG. 1 is the 01 spectral envelope of the oxidized nanotubes of Example 10.

FIG. 2 is the 01 spectral envelope of the oxidized nanotubes of Example 25.

CARBON NANOTUBES

The carbon nanotubes treated according to the methods of the present invention have been more specifically described above under the heading "Carbon Nanotubes" and they are preferably prepared according to Moy et al., U.S. patent application Ser. No. 08/459,534 filed Jun. 2, 1995 assigned to Hyperion Catalysis International, Inc. of Cambridge, Mass., hereby incorporated herein by reference.

Preferably, the carbon nanotubes treated according to the invention have a diameter less than one micron, preferably less than 0.2 micron and even more preferably a diameter between 2 and 100 nanometers. Most preferred are carbon nanotubes having diameters between 3.5 to 70 nanometers.

The nanotubes are substantially cylindrical, graphitic carbon fibrils of substantially constant diameter and are substantially free of pyrolytically deposited carbon. The nanotubes include those having a length to diameter ratio of greater than 5 with the projection of the graphite layers on the nanotube axis extending for a distance of less than two nanotube diameters. Most preferred are multiwalled nanotubes as described in Tennent. et al., U.S. Pat. No. 5,171,560.

Methods For Oxidizing Nanotubes and Aggregates of Nanotubes

The invention relates to methods for treating discrete nanotubes, aggregates of nanotubes or mixtures of discrete nanotubes and aggregates of nanotubes under oxidation conditions. The resulting surface-oxidized nanotubes can be more easily dispersed in organic or inorganic solvents, and especially in water, than nanotubes not treated according to the invention.

The surface-oxidized nanotubes can be included in matrices of other materials, such as plastics, or made into structures useful in catalysis, chromatography, filtration systems, electrodes, capacitors and batteries, etc.

Oxidation Compounds

Compounds useful for the treatment of carbon nanotubes encompass broadly, peroxygen compounds including inorganic peracids, organic peracids and salts of inorganic and organic peracids, hydrogen peroxide and hydroperoxides. Peroxygen compounds useful herein are derivatives of hydrogen peroxide and contain one or more directly linked pairs of oxygen atoms, —O—O—. They may include organic or inorganic compounds and contain at least one pair of oxygen atoms bound by a single covalent bond in which each oxygen atom has an oxidation number of −1.

The peracids are compounds containing the group —O—O—H derived from an organic or inorganic acid. Typical compounds include $CH_3C(O)OOH$ derived from acetic acid and $HOS(O_2)OOH$ (peroxymonosulfuric acid) derived from sulfuric acid. Other peracids include compounds in their highest state of oxidation. The prefixes "peroxy" and "peroxo" are used interchangeably. Hydroperoxides, including hydrogen peroxide, contain specifically, the group O—O—H.

The organic peroxyacids include:
1) peroxycarboxylic acids of the formula $$Q(C(O)OOH)_n$$

where Q is H, alkyl, aralkyl, cycloalkyl, aryl or heterocyclic group and n is 1 or 2, and
2) hydroperoxides of the formula $$Q(OOH)_n$$

where Q is as defined above. The alkyl, aralkyl, cycloalkyl, aryl or heterocyclic groups include from 1 to 18 carbons, preferably from 2–12 carbons and most preferably from 4–8 carbons. Heteroatoms in the heterocyclic groups include oxygen, nitrogen or sulfur.

Examples of peroxyacids suitable for use in the invention include peracetic acid (peroxyacetic acid), m-chloroperoxybenzoic acid and magnesium monoperoxyphthalate hexahydrate, all of which are commercially available. Others are performic acid (peroxy formic acid) (HC(O)OOH) and perbenzoic acid (benzoyl hydroperoxide).

Inorganic peroxoacids include persulfates, such as Na, K or $NH_4$ persulfate, peroxosulfuric acid (persulfuric acid or Caro's acid, $H_2SO_5$ or $HOSO_2 OOH$), peroxomonosulfates and salts thereof such as potassium peroxomonosulfate (Oxone®), peroxodisulfates and salts thereof such as ammonium peroxodisulfate (($NH_4)_2S_2O_8$) (ammonium persulfate), potassium peroxodisulfate ($K_2S_2O_8$), and sodium peroxodisulfate ($Na_2S_2O_8$).

Inorganic peroxides which can be used also include perborates and percarbonates which are essentially mixtures of hydrogen peroxide and salts. Still others include peroxides of alkali metals, alkaline earth metals, lanthanides, divalent zinc and uranyl ion. These species release hydrogen peroxide when in contact with water or dilute aqueous acid. Those having high thermal stability are suitable for the slow release of peroxide.

The hydroperoxides include, for example methyl, ethyl, isopropyl, n-, i-, or t-butyl, cumene and ethylbenzyl peroxides, and hydrogen peroxide.

Methods of Oxidizing Nanotubes

The invention includes a method of treating an aggregate of carbon nanotubes so that the aggregate can be more readily disassembled and the constituent nanofibers disentangled from one another. The aggregate is contacted with a composition comprising a peroxygen compound, i.e., peroxoinorganic acid, salts of peroxoinorganic acid, peroxyorganic acid, salts of peroxyorganic acid, or hydroperoxides, or under carbon nanotube oxidizing conditions.

A co-catalyst may be used in conjunction with some oxidizing agents, particularly with hydrogen peroxide. Suitable co-catalysts include metal oxides such as $V_2O_4$, $CrO_3$, $MoO_3$, $WO_3$, $OsO_4$, $RuO_4$, $TiO_2$ and ferrous sulfate.

While contacting conditions may vary within a wide range, suitable conditions for oxidizing the carbon nanotubes include, a temperature broadly from 5° C. to about 150° C., preferably from 10 to 75° C. and most desirably from 20 to 35° C., and a pressure from about 0.1 psi to about 500 psi. A useful time period for contacting the carbon nanotubes, nanotube aggregates or mixtures of nanotubes and aggregates under oxidation conditions according to the invention is from about 0.5 hours to about 24 hours, preferably from 1–12 hours.

The invention provides economical, environmentally benign methods to oxidize the surface of the carbon nanotubes. While it is not intended to be bound by theory, it is believed that when treating the carbon nanotubes according to the invention, oxygen-containing moieties are introduced onto the surface of the side walls of the carbon nanotubes. The surface oxidized nanotubes become functionalized with oxygen-containing functional groups, including carbonyl, carboxyl, hydroxyl and/or carboalk(ar)oxy groups forming phenol, alcohols, aldehydes, ketones, quinones, acids and esters/lactones, and derivatives thereof.

In the treated nanotubes, the surface atoms, $C_n$, are reacted. Most carbons in the surface layer of a graphitic fibril, as in graphite, are basal plane carbons. Basal plane carbons are relatively inert to chemical attack. At defect sites, where, for example, the graphitic plane fails to extend fully around the fibril, there are carbon atoms analogous to the edge carbons of a graphite plane (See Urry, *Elementary Equilibrium Chemistry of Carbon*, Wiley, New York 1989 for a discussion of edge and basal plane carbons).

At defect sites, edge or basal plane carbons of lower, interior layers of the nanotube may be exposed. The term surface carbon includes all the carbons, basal plane and edge, of the outermost layer of the nanotube, as well as carbons, both basal plane and/or edge, of lower layers that may be exposed at defect sites of the outmost layer. The edge carbons are reactive and must be bound to some heteroatom or group to satisfy carbon valency. Reactive carbons are also present at defect sites which contain areas where the hexagonal array of carbons making up the graphitic or graphenic sheets are disrupted by the inclusion of 5- or 7-membered rings.

Untreated nanotubes give titers of about 0.01 meg/g. The oxidized nanotubes produced by the methods of the invention exhibit, upon titration, an acid titer from 0.03 meq/g to about 1.0 meq/g and preferably from about 0.05 meq/g to about 0.50 meq/g. The content of acid sites (carboxylic acid) is determined, for example, by reacting an amount of 0.1 N NaOH in excess of the anticipated titer with the sample and then back titrating the resulting slurry with 0.1 N HCl to an end point determined potentiometrically at pH 7.

Dispersion of Aggregates of Nanotubes

It has been found that aggregates of nanotubes treated according to the methods of the invention can be dispersed to some degree in liquid media and at least partially disassembled. The term dispersed or dispersion means that the degree of aggregation of the as-made aggregate is reduced leading to a measurable change in one or more physical properties of the aggregate.

Thus it has been found that aggregates of fibrils increase in size and decrease in density when treated according to the invention. While it is difficult, if not impossible, to measure the degree of increased dispersion of an aggregate while the aggregate is still in liquid suspension, it has been found that aggregates after being filtered from suspension, are increased in size by at least 5 percent and may be increased in size by at least 10 percent or more. The degree of entanglement of the nanotubes is lessened. It has also been observed that nanotubes on the exterior of the aggregate unwind from the main body and/or separate entirely from the main body of the aggregate and become suspended in the medium. The aggregate takes on the appearance of a fuzzy tennis ball or a severely weakened rope.

Without being bound by theory, it is believed that the aggregates treated according to the invention assume a post-treatment morphology which can be described as "loose bundles" having the appearance of severely weathered rope. The nanotubes themselves attain a morphology similar to the as-synthesized nanotubes, however, with oxygen groups attached to the nanotube surfaces. It is also believed that in the case of aggregates, the chemical bonding between the catalyst particle, which defines the size of the bundles, and the nanotubes is decreased or eliminated. In addition, the nanotubes may or may not be shortened and carbon layers are believed to be partially stripped. An increase in specific surface area has also been observed. For example, untreated aggregates have a specific surface area of about 250 m$^2$/g, while oxidized aggregates display a specific surface area up to 400 m$^2$/g.

Secondary Functionalization of Oxidized Nanotubes

Advantageously, the oxidized nanotubes obtained by the oxidizing methods of the invention are further treated. In one embodiment of the invention, after the oxidized nanotubes are formed, they may be further treated in a secondary treatment step, by contacting with a suitable reagent which reacts with moieties in the oxidized nanotubes introduced in the first step, thereby adding at least one other secondary functional group. Secondary derivatives of the oxidized nanotubes are virtually limitless. For example, oxidized nanotubes bearing acidic groups like —COOH are convertible by conventional organic reactions to virtually any desired secondary group, thereby providing a wide range of surface hydrophilicity or hydrophobicity.

The secondary groups that can be added by reacting with the moieties of the oxidized nanotubes include but are not limited to alkyl/aralkyl, hydroxyl, amine, alkyl aryl silane and fluorocarbon groups having from 1 to 18 carbons. Other secondary groups that can be attached to the moieties present on the oxidized nanotubes include proteins, enzymes, antibodies, nucleotides, oligonucleotides, antigens, enzyme substrates, or enzyme inhibitors or the transition state analogs of enzyme substrate. In carboxylic acid-functionalized nanotubes, for example, alcohols or amines are easily linked to acid moieties to give stable esters or amides. If the alcohol or amine is part of a di- or poly-functional molecule, then linkage through the O— or NH— leaves the other functionalities as pendant groups. Typical examples of secondary reagents are:

further contacting the secondarily-functionalized nanotubes with a cross-linking agent effective for producing a network of carbon nanotubes. A preferred cross-linking agent is a polyol, polyamine or polycarboxylic acid. A useful polyol is a diol and a useful polyamine is a diamine.

In one aspect of the invention, a network of carbon nanotubes is prepared by first oxidizing the as-produced nanotubes with the oxidizing agents of the invention, followed by subjecting the oxidized nanotubes to conditions which foster crosslinking. For example, heating the oxidized nanotubes in a temperature range of from 180° C. to 450° C. results in crosslinking the oxidized nanotubes together with elimination of the oxygen containing moieties of the oxidized nanotubes.

Three Dimensional Structures

The invention also includes three-dimensional networks formed by linking surface-modified nanotubes of the invention. These complexes include at least two surface modified nanotubes linked by one or more linkers comprising a direct bond or chemical moiety. These networks comprise porous media of remarkably uniform equivalent pore size. They are useful as adsorbents, catalyst supports and separation media.

Stable, porous three-dimensional structures are very useful as catalyst or chromatography supports. The oxidized nanotubes are more easily dispersed in aqueous media than unoxidized nanotubes. Since nanotubes can be dispersed on an individualized basis, a well-dispersed sample which is stabilized by cross-links allows one to construct such a support. Surface oxidized nanotubes are ideal for this application since they are easily dispersed in aqueous or polar media and the oxygen-containing moieties present on the oxidized nanotubes provide cross-link points. Additionally, the oxygen-containing moieties provide points to support the catalytic or chromatographic sites. The end result is a rigid, three-dimensional structure with its total surface area provided with functional sites on which to support the active agent.

Although the interstices between these nanotubes are irregular in both size and shape, they can be thought of as

| GENERAL FORMULA | PENDANT GROUP | EXAMPLES |
|---|---|---|
| HO—R, R = alkyl, aralkyl, aryl, fluoroethanol, polymer, SiR'$_3$ | R— | Methanol, phenol, tri-fluorocarbon, OH-terminated Polyester, silanols |
| H$_2$N—R R = same as above | R— | Amines, anilines, fluorinated amines, silylamines, amine terminated polyamides |
| Cl—SiR$_3$ | SiR$_3$— | Chlorosilanes |
| HO—R—OH, R = alkyl, aralkyl, CH$_2$O- | HO— | Ethyleneglycol, PEG, Penta-erythritol, bis-Phenol A |
| H$_2$N—R—NH$_2$, R = alkyl, aralkyl | H$_2$N— | Ethylenediamine, polyethyleneamines |
| X—R—Y, R = alkyl, etc; X=OH or NH$_2$; Y=SH, CN, C=O, CHO, alkene, alkyne, aromatic, heterocycles | Y— | Polyamine amides, Mercaptoethanol |

R is preferably a group having 1 to 18 carbon atoms.

Formation of Other Structures

The invention is also useful in producing a network of carbon nanotubes. A network of carbon nanotubes is produced by contacting carbon nanotubes with an oxidizing agent for a period of time sufficient to oxidize the surface of the carbon nanotubes, contacting the surface-oxidized carbon nanotubes with reactant suitable for adding a secondary functional group to the surface of the carbon nanotubes, and pores and characterized by the methods used to characterize porous media. The size of the interstices in such networks can be controlled by the concentration and level of dispersion of nanotubes, and the concentration and chain lengths of the cross-linking agents. Such materials can act as structured catalyst supports and may be tailored to exclude or include molecules of a certain size. In addition to uses with conventional industrial catalysts, they have special applications as large pore supports for biocatalysts.

Typical applications for these supports in catalysis include their use as a highly porous supports for metal catalysts laid down by impregnation, e.g., precious metal hydrogenation catalysts. Moreover, the ability to anchor molecular catalysts by tether to the support via the secondary groups combined with the very high porosity of the structure allows one to carry out homogeneous reactions in a heterogeneous manner. The tethered molecular catalyst is essentially dangling in a continuous liquid phase, similar to a homogeneous reactor, in which it can make use of the advantages in selectivities and rates that go along with homogeneous reactions. However, being tethered to the solid support allows easy separation and recovery of the active, and in many cases, very expensive catalyst.

These stable, rigid structures also permit carrying out reactions which previously have proved difficult to carry out, such as asymmetric syntheses or affinity chromatography, by attaching a suitable enantiometric catalyst or selective substrate to the support. The rigid networks can also serve as the backbone in biomimetic systems for molecular recognition. Such systems have been described in U.S. Pat. No. 5,110,833 and International Patent Publication WO93/19844. The appropriate choices for cross-linkers and complexing agents allow for stabilization of specific molecular frameworks.

Another example of a three-dimensional structure based upon the invention is a fibril-ceramic composite.

Rigid Porous Carbon Nanotube Structures

The carbon nanotubes oxidized according to the invention can also be used to form rigid porous structures. Rigid porous structures may be made by first preparing surface-oxidized nanotubes as described above, dispersing them in a medium to form a suspension and separating the medium from the suspension to form a porous structure. The surface-oxidized nanotubes are then further interconnected to form a rigid porous structure in accordance with methods more particularly described in Tennent et al., U.S. Pat. No. 6,099,965 entitled "Rigid Porous Carbon Structures, Methods of Making, Methods of Using and Products Containing Same", hereby incorporated by reference.

The nanotubes used to form rigid structures can be in the form of discrete fibers or aggregates of nanotubes. The former results in a structure having fairly uniform properties. The latter results in a structure having two-tiered architecture comprising an overall macrostructure comprising aggregates of nanotubes bonded together and a microstructure of intertwined nanotubes within the individual aggregates. When the former is desired, the nanotubes are dispersed thoroughly in the medium to form a dispersion of individual nanotubes. When the latter is desired, nanotube aggregates are dispersed in the medium to form a slurry and the aggregate particles are connected together with a gluing agent to form the structure.

In one method, a porous carbon structure having a surface area greater than at least 100 $m^2$/gm, is prepared comprising dispersing a plurality of nanotubes in a medium to form a suspension and then separating the medium from the suspension to form the structure. The nanotubes are then interconnected to form a rigid structure of entwined nanotubes at nanotube intersections within the structure.

In order to increase the stability of the nanotube structures, polymer may be deposited at the intersections of the structure to glue the structure and rigidize it. This may be achieved by infiltrating the assemblage with a dilute solution of low molecular weight glue (i.e., less than about 1,000 MW) and allowing the solution to evaporate. Capillary forces will concentrate the polymer at nanotube intersections. Only a small fraction of the intersections need be glued.

The dispersion medium may be selected from the group consisting of water and organic solvents. Preferably, the medium comprises a dispersant selected from the group consisting of alcohols, glycerin, surfactants, polyethylene glycol, polyethylene imines and polypropylene glycol.

A medium should be selected which allows for fine dispersion of the gluing agent in the aggregate and which also acts as a templating agent to keep the structure of the aggregates from collapsing as the mix dries down. In a preferred embodiment, a combination of polyethylene glycol (PEG) and glycerol dissolved in water or alcohol is used as the dispersing medium, and a carbonizable material such as low molecular weight phenol-formaldehyde resins or carbohydrates (starch or sugar) is used. Once the rigid structure has been prepared, it can then be oxidized with the oxidizing agents of the invention in preparation for use in electrochemical capacitors, for example. The oxidation occurs under the same conditions as are used to oxidize nanotubes, or aggregates or assemblages of carbon nanotubes.

According to another embodiment, when the nanotubes are dispersed in suspension with gluing agents, the gluing agents bond the nanotubes to form the rigid structure. Preferably, the gluing agent comprises carbon, more preferably, the gluing agent is selected from materials which, when pyrolized, leave only carbon. Accordingly, the structure formed with such a gluing agent may be subsequently pyrolyzed to convert the gluing agent to carbon. Preferably, the gluing agents are selected form the group consisting of cellulose, carbohydrates, polyethylene, polystyrene, nylon, polyurethane, polyester, polyamides and phenolic resins.

Separating the nanotubes from the suspension or medium comprises filtering the suspension or evaporating the medium from the suspension. Where the suspension is a gel or paste comprising the nanotubes in a fluid, separating comprises: (a) heating the gel or paste in a pressure vessel to a temperature above the critical temperature of the fluid; (b) removing supercritical fluid from the pressure vessel; and (c) removing the structure from the pressure vessel.

Isotropic slurry dispersions of nanotube aggregates in water/PEG mixtures containing resin can be prepared using a blender without disrupting the aggregates. The nanofiber aggregates trap the resin particles and keep them distributed. These mixtures can be used as is or filtered down to remove sufficient solvent to obtain cakes with high nanotube content (5–20% dry weight basis). The cake can be molded, extruded or pelletized. The molded shapes are sufficiently stable so that further drying occurs without collapse of the form. On removing solvent, dispersant molecules, along with particles of gluing agent are concentrated and collect at nanotube crossing points both within the nanotube aggregates, and at the outer edges of the aggregates. As the mixture is further dried down and eventually carbonized, nanotube strands within the aggregates and the aggregates themselves are glued together at contact points. Since the aggregate structures do not collapse, a relatively hard, very porous, low density particle is formed.

The rigid, porous structures may also be formed using oxidized nanotubes with or without a gluing agent. Carbon nanotubes become self-adhering after oxidation. Very hard, dense mats are formed by highly dispersing the oxidized nanotubes, filtering and drying. The dried mats have densities between 1–1.2 g/cc, depending on oxygen content, and are hard enough to be ground and sized by sieving. Measured surface areas are about 275 m²/g.

The structure may be pyrolized to remove oxygen. The pyrolysis temperature is broadly from about 200° C. to about 2000° C. and preferably from about 200° C. to about 900° C. Substantially all the oxygen within the resulting rigid structure can be removed by pyrolizing the particles at about 600° C. in flowing gas, for example argon. Densities decrease to about 0.7–0.9 g/cc and the surface areas increase to about 400 m²/g. Pore volumes for the calcined particles are about 0.9–0.6 cc/g, measured by water absorption.

The oxidized nanotubes may also be used in conjunction with a gluing agent. Oxidized nanofibers are good starting materials since they have attachment points to stick both gluing agents and templating agents. The latter serve to retain the internal structure of the particles or mats as they dry, thus preserving the high porosity and low density of the original nanofiber aggregates. Good dispersions are obtained by slurrying oxidized nanotubes with materials such as polyethyleneimine cellulose (PEI Cell), where the basic imine functions form strong electrostatic interactions with carboxylic acid functionalized fibrils. The mix is filtered to form mats. Pyrolizing the mat at temperatures greater than 650° C. in an inert atmosphere converts the PEI Cell to carbon which fuses the nanotube aggregates together into hard structures. The result is a rigid, substantially pure carbon structure, which can then be oxidized according to the invention.

Solid ingredients can also be incorporated within the structure by mixing the additives with the nanotube dispersion prior to formation of the structure. The content of other solids in the dry structure may be made as high as fifty parts solids per part of nanotubes.

According to one preferred embodiment, nanotubes are dispersed at high shear in a high-shear mixer, e.g. a Waring Blender. The dispersion may contain broadly from 0.01 to 10% nanotubes in water, ethanol, mineral spirits, etc. This procedure adequately opens nanotube bundles, i.e. tightly wound bundles of nanotubes, and disperses the nanotubes to form self-supporting mats after filtration and drying. The application of high shear mixing may take up to several hours. Mats prepared by this method, however, are not free of aggregates.

If the high shear procedure is followed by ultrasonication, dispersion is improved. Dilution to 0.1% or less aids ultrasonication. Thus, 200 cc of 0.1% fibrils, for example, may be sonicated by a Bronson Sonifier Probe (450 watt power supply) for 5 minutes or more to further improve the dispersion.

To achieve the highest degrees of dispersion, i.e. a dispersion which is free or virtually free of nanotube aggregates, sonication must take place either at a very low concentration in a compatible liquid, e.g. at 0.001% to 0.01% concentration in ethanol or at higher concentration e.g. 0.1% in water to which a surfactant, e.g. Triton X-100, has been added in a concentration of about 0.5%. The mat which is subsequently formed may be rinsed free or substantially free of surfactant by sequential additions of water followed by vacuum filtration.

Particulate solids such as $MnO_2$ (for batteries) and $Al_2O_3$ (for high temperature gaskets) may be added to the oxidized nanotube dispersion prior to mat formation at up to 50 parts added solids per part of nanotubes.

Reinforcing webs and scrims may be incorporated on or in the mats during formation. Examples are polypropylene mesh and expanded nickel screen.

Oxidized Nanotubes in Electrodes and in Electrochemical Capacitors

Carbon nanotubes are electrically conductive. Electrodes comprising carbon nanotubes and/or functionalized carbon nanotubes and their use in electrochemical capacitors have been described in U.S. Pat. No. 6,031,711, hereby incorporated by reference. Further details about electrochemical capacitors based on catalytically grown carbon nanotubes are disclosed by Niu et al., "High Power Electrochemical Capacitors Based on Carbon Nanotube Electrodes", *Applied Physics Letters* 70(11):1480–1482 (1997) incorporated herein by reference.

One aspect of the invention relates to preparing electrodes and electrochemical capacitors from surface-oxidized carbon nanotubes. Broadly, as prepared carbon nanotubes have been treated with oxidizing agents of the invention to provide surface-oxidized, carbon nanotubes which can be used to prepare electrodes. In another aspect of the invention, the oxidized nanotubes can be further treated with a reactant suitable to react with moieties present on the oxidized nanotubes to form nanotubes having secondary groups on its surface which are also useful in preparing electrodes and electrochemical capacitors.

Electrodes are assembled by simple filtration of slurries of the treated nanotubes. Thickness is controlled by the quantity of material used and the geometry, assuming the density has been anticipated based on experience. It may be necessary to adjust thickness to get self-supporting felts. Composite electrodes from slurries of nanotubes and conventional fibers may be used.

The electrodes are advantageously characterized by cyclic voltammetry, conductivity and DC capacitance measurement. To prepare a Faradaic electrode with redox potential near zero (NHE), surface groups are introduced that have a redox potential near zero. Such surface groups advantageously include disulfides and quaternary amines. The sulfides or appropriate amines are advantageously adsorbed or precipitated in the presence of fibrils, before assembly into mats.

The quality of sheet electrode depends on the microstructure of the electrode, the density of the electrode, the functionality of the electrode surface and mechanical integrity of the electrode structure. The microstructures of the electrode, namely, pore size and size distribution determines the ionic resistance of electrolyte in the electrode. The surface area residing in micropores (pore diameter <2 nm) is considered inaccessible for the formation of a double layer. On the other hand, distributed pore sizes, multiple-pore geometries (dead end pores, slit pores, cylindrical pores, etc.) and surface properties usually give rise to a distributed time constant. The energy stored in an electrode with a distributed time constant can be accessed only with different rates. The rapid discharge needed for pulsed power is not feasible with such an electrode.

The density of the electrode determines its volumetric capacitance. An electrode with density less than 0.4 g/cc is not practical for real devices. A low-density electrode will take up too much electrolyte, which will decrease both the volumetric and the gravimetric capacitance of the device.

The surface of the carbon nanotubes is related to the wetting properties of electrodes with respect to electrolytes. The surface of as-produced, catalytically grown carbon nanotubes is hydrophobic. It has been unexpectedly found that treatment of the as-produced carbon nanotubes or aggregates of carbon nanotubes with the oxidizing agents of the invention can change the hydrophobic surface properties of the as-produced carbon nanotubes to hydrophilic. It is necessary to oxidize the surface of the carbon nanotubes to improve their wetting properties for aqueous electrolytes. The capacitance can be increased by further attaching redox groups on the surface of the carbon nanotubes.

The structural integrity of the electrodes is critical to the reproducibility and long term stability of the device. The mechanical strength of electrodes incorporating carbon nanotubes is determined by the degree of entanglement of the carbon nanotubes and the bonding between the carbon nanotubes in the electrode. A high degree of entanglement and carbon nanotube bonding can also improve the conductivity, which is critical to the power performance of an electrode. The specific capacitance (D.C. capacitance) of the electrodes made from fibrils treated according to the methods of the invention is about 30 F/g to about 150 F/g.

Aerogel or Xerogel Composites

Another aspect of the invention relates to the formation of aerogel or xerogel composites comprising the oxidized nanotubes of the invention to form rigid porous structures. Aerogels are a unique class of materials with extremely low density, high porosity and surface areas. Organic aerogels and carbon aerogels are attractive for many applications including high density energy storage, high capacity absorbents and catalyst supports. Similar materials, so called foamed organic polymers with relatively low density, are well known and are widely used as insulating materials. A xerogel is similar to an aerogel, but has a denser structure as a result of the method of manufacture.

Such structures are set forth more fully in U.S. Pat. No. 5,476,878 to Pekala; U.S. Pat. No. 5,124,100 to Nishii et al.; U.S. Pat. No. 5,494,940 to Unger et al.; U.S. Pat. No. 5,416,376 to Wuest et al; U.S. Pat. No. 5,409,683 to Tillotson et al.; U.S. Pat. No. 5,395,805 to Droege et al.; U.S. Pat. No. 5,081,163 to Pekala; U.S. Pat. No. 5,275,796 to Tillotson; U.S. Pat. No. 5,086,085 to Pekala; and U.S. Pat. No. 4,997,804 to Pekala, each of which are hereby incorporated by reference.

Preparation of Catalysts

The oxidized nanotubes of the invention can also be used to make rigid supports for catalysts, e.g., for conducting a fluid phase catalytic chemical reaction. The supported catalyst of the invention comprises a support comprising a rigid carbon nanofiber structure and a catalytically effective amount of a catalyst supported thereon.

Rigid supported catalysts of the invention have unique properties. They are exceptionally mesoporous and macroporous and they are pure and they are resistant to attrition, compression and shear and consequently can be separated from a fluid phase reaction medium over a long service life. The increased rigidity of the supports of the invention enables the structures to be used in fixed bed catalytic reactions. A packing containing the sized, rigid structures can be formed and a fluid or gas passed through the packing without significantly altering the shape and porosity of the packing since the rigid structures are hard and resist compression.

Detailed descriptions of suitable methods for making catalyst supports using, e.g., combed yarn nanofiber structures on planar supports, are set forth in Moy et al., U.S. Pat. Nos. 5,456,897, 6,358,878 and 5,726,116. Improved methods and catalysts are further taught in Moy et al, U.S. Pat. Nos. 6,143,689, 6,294,144 and 5,569,635. U.S. Pat. No. 5,569,635 describes methods of forming catalyst supports with non-rigid nanofiber aggregates. The methods described are suitable for making and using catalyst supports using the rigid porous nanofiber structures of the invention.

The invention is further described in the following examples.

EXAMPLE 1

Aggregates of carbon nanotubes having a cotton candy morphology as described in Moy et al, having a cotton candy morphology as described in Moy et al, U.S. Pat. No. 5,456,897 prepared by methods described in Moy et al., U.S. Pat. No. 6,143,689 were oxidized as described below.

Oxidation was carried out by stirring the nanotubes in 1M $(NH_4)_2S_2O_8$/1M $H_2SO_4$ solution for time periods of one to seven days at room temperature. The 1M $(NH_4)_2S_2O_8$/1M $H_2SO_4$ solution was prepared by dissolving $(NH_4)S_2O_8$ (Aldrich) in 1M $H_2SO_4$. Concentrations of nanotubes ranging from 3.247 g to 15 g in 300 cc 1M $(NH_4)S_2O_8$/1M $H_2SO_4$ solution were used. Thick nanotube slurrys were formed during oxidation. The slurry was filtered, washed and dried to yield oxidized nanotubes. Determinations were made of the concentration of acidic groups on the surface of the treated nanotubes. The results are shown in Table 1 below.

TABLE 1

| Sample | Oxidation Condition | Weight Change | Surface group (meq/g) |
|---|---|---|---|
| 1. | 300 cc 1 M $(NH_4)_2S_2O_8$/1 M $H_2SO_4$; 15 g CC fibrils, RT, 2 days | + | 0.73 |
| 2. | 300 cc 1 M $(NH_4)_2S_2O_8$/1 M $H_2SO_4$; 7.521 g CC fibrils, RT, 2 days | + | 0.76 |
| 3. | 300 cc 1 M $(NH_4)_2S_2O_8$/1 M $H_2SO_4$; 7.492 g CC fibrils, RT, 1 day | + | 0.52 |
| 4. | 300 cc 1 M $(NH_4)_2S_2O_8$/1 M $H_2SO_4$; 3.247 g CC fibrils, RT, 1 day | + | 0.52 |

The concentration of acidic groups on the surface of the modified nanotubes strongly correlates with the duration of reaction. A concentration of 0.76 meq/g was obtained after two days of reaction, compared to 0.52 meq/g for a one-day reaction. However, increasing reaction time from two days to seven days resulted in a gain of only 0.13 meq/g.

The oxidized fibrils were produced as solid cakes whereas the unoxidized fibrils are produced as loose powders. The oxidized fibrils appear to have a lesser degree of entanglement than unoxidized fibrils and to have the appearance of weathered rope with more broken and loose ends.

EXAMPLE 2

The nanotubes described in Example 1 were oxidized as described below.

Oxidation was carried out with 0.5M $(NH_4)S_2O_8$. Reaction conditions and the properties of the oxidized nanotubes are summarized in Table 2 below:

TABLE 2

| Sample | Oxidation Condition | Weight Change | Surface group (meq/g) |
|---|---|---|---|
| 1. | 300 cc 0.5 M $(NH_4)_2S_2O_8$/1 M $H_2SO_4$ 7.513 g CC nanotubes, RT, 1 day | + | 0.48 |

TABLE 2-continued

| Sample | Oxidation Condition | Weight Change | Surface group (meq/g) |
|---|---|---|---|
| 2. | 300 cc 0.5 M $(NH_4)_2S_2O_8$/1 M $H_2SO_4$ 7.492 g CC nanotubes, RT, 2 days | + | 0.68 |

A change of concentration of $(NH_4)_2S_2O_8$ from 1 M to 0.5M only slightly affected the results of the oxidation. An acidic group concentration of 0.68 meq/g was titrated from the product prepared with 0.5 m $(NH_4)_2S_2O_8$/1M $H_2SO_4$, compared to a value of 0.76 meq/g for a sample prepared with 1 M $(NH_4)_2S_2O_8$/1M $H_2SO_4$.

EXAMPLE 3

0.3 g of oxidized CC nanotubes (Sample 2 of Example 1) were added to 300 cc of water in a beaker. 5 drops of surfactant (Triton X-100, from Sigma) were added. The mixture was sonicated for 5 minutes with a 400 W ultrasonic processor to disperse the nanotubes. A mat with a diameter of 3.3" was prepared by filtration of the dispersion with a three-piece glass filtration assembly using a polyvinylidene fluoride (PVDF) membrane. After drying at 100° C., the mat was heated at 350° C. in air for 4 hr. The final weight of the mat was 283 mg. The thickness of the mat was 0.0049 inches. The density of the mat was 0.41/cc.

EXAMPLE 4

The procedure described in Example 3 was followed. Nanotube mats were prepared from Samples 2, 3, and 4 of Example 1. The mats had thicknesses of 0.0045", 0.0049" and 0.0049", and densities of 0.42, 0.43 and 0,43 g/cc, respectively.

EXAMPLE 5

0.3 g of oxidized CC nanotubes (Sample 1 of Example 2) were made into a mat following the procedure described in Example 3. The final weight of the mat was 270 mg. The thickness of the mat was 0.005". The density of the mat was 0.42 g/cc.

EXAMPLE 6

0.3 g of oxidized CC nanotubes (Sample 2 of Example 2) were made into a mat by following the procedure described in Example 3. The final weight of the mat was 283 mg. The thickness of the mat was 0.0049". The density of the mat was 0.43 g/cc.

EXAMPLE 7

Electrodes with a diameter of 0.5" were prepared from the mats described in Examples 3 and 4. Electrochemical capacitors were fabricated with two electrodes separated by a Celgard separator using 38% sulfuric acid as the electrolyte.

The equivalent series resistance (E.S.R.) of the test capacitor was measured using a fixed frequency meter at 1 kHz. The specific capacitance of the electrode was calculated from a constant current discharging method. Impedance analysis was carried out with a Solartron 1250 frequency response analyzer driving an EG&G PAR model 373 Potentiostat/Galvanostat at dc biases of 0 and 1 V with a 10 mA amplitude sinusoidal signal. The "knee" point (at which most of the stored energy in the device can be accessed) and pore resistance for each capacitor were deducted from the complex-plane impedance plot. Results are summarized in Table 3 below.

TABLE 3

| Sample | T (inch) | Density (g/cc) | E.S.R (Ω) | C (F/g) | Knee f(Hz) | Pore-R (Ω) |
|---|---|---|---|---|---|---|
| 1. | 0.0049 | 0.41 | 0.052 | 46.7 | 150 | 0.005 |
| 2. | 0.0045 | 0.42 | 0.045 | 49.2 | 154 | 0.006 |
| 3. | 0.0049 | 0.43 | 0.044 | 44.6 | 150 | 0.005 |
| 4. | 0.0049 | 0.43 | 0.037 | 45.6 | 151 | 0.005 |

T is the electrode thickness
Density is the electrode density
E.S.R is the equivalent series resistance of the single cell electrochemical capacitor
C is the specific capacitance of electrodes
Knee f is the frequency at knee point in plots of capacitance vs. frequency
Pore-R is pore resistance The results show that other than specific capacitance, which increased slightly with increasing concentration of surface acidic groups, no significant differences were observed. All the electrodes had excellent frequency response.

EXAMPLE 8

0.5" diameter electrodes were prepared from the mats prepared in Examples 5 and 6. Electrochemical capacitors were fabricated and tested following the procedure described in Example 7. Results are summarized in Table 4.

TABLE 4

| Sample | T (inch) | Density (g/cc) | E.S.R (Ω) | C (F/g) | Knee f(Hz) | Pore-R (Ω) |
|---|---|---|---|---|---|---|
| 1. | 0.0050 | 0.42 | 0.049 | 44.6 | 152 | 0.005 |
| 2. | 0.0049 | 0.43 | 0.053 | 46.4 | 152 | 0.005 |

The electrodes showed frequency response characteristics similar to that of electrodes prepared from samples oxidized with 1M $(NH_4)_2S_2O_8$.

EXAMPLE 9

BN nanotubes (12.0 g, 1.0 gram-atoms) were treated with 453 g of a 30% aqueous solution of $H_2O_2$ (136 g $H_2O_2$, 4.0 moles): The $H_2O_2$/C molar ratio was 4.0. The reaction was performed in a round bottom flask submerged in a 35–40° C. water bath. The temperature in the flask rapidly rose to 80–90° C. Reaction was carried out for 2 hrs. After that time, the slurry was cooled to room temperature. Peroxide content was negative a determined by starch-iodine test strips. The nanotubes were filtered and washed with several liters of DI Water. The wash effluent had the same pH as the wash water (~5). A total of 11.58 grams of oxidized nanotubes were recovered after drying at 125° C. Titration of an aliquot of oxidized nanotubes gave a value of 0.124 meq acid/g nanotubes.

EXAMPLE 10

CC nanotubes (20.0 g, 1.67 gram-atoms) were treated with 376 g of a 30% aqueous solution of $H_2O_2$ (113 g, 3.32 moles). The molar ratio of $H_2O_2$ to C was 2.0. The reaction was carried out in a manner similar to Ex. 9. Recovery was 19.65 g. Titration of a nanotube sample showed an acidic concentration of 0.128 meq/g.

EXAMPLE 11

A sample of oxidized nanotubes (18.25 g) from Example 10 was further reacted with 161 of 30% $H_2O_2$. The temperature rapidly rose to reflux temperature. After the flask cooled down to near room temperature, another 226.7 g of 30% $H_2O_2$ was added. The temperature again rose to 75° C. Nanotubes were filtered and dried as in the previous Examples. Total recovery was 17.84 g. An aliquot gave a titer of 0.26 meq/g.

EXAMPLE 12

A sample of CC nanotubes (21.0 g, 1.75 gram-atoms) was treated with 161 grams of 30% $H_2O_2$ (60 g, 1.76 moles) dissolved in 6 N acetic acid. The molar ratio of $H_2O_2$ to C was 1.0. Only a mild exotherm was noted, and the slurry was stirred at 75° C. overnight. Nanotubes were filtered, washed until all acid was removed and dried at 125° C. Recovery was 20.7 g. Titration showed an acidic concentration of 0.12 meq/g.

EXAMPLE 13

$H_2O_2$ was added in a slow, continuous manner to CC nanotubes (1.2 g, 0.1 mol) dispersed in DI water using a Waring blender and transferred to a flask fitted with an overhead stirrer. 30% $H_2O_2$ (46 gms, 0.50 moles) was added using a syringe pump at the rate of 2.6 cc/hr. The molar ratio of $H_2O_2$ to C was 5.0. The reaction was carried out at room temperature for a total of 28 hrs. After that time, peroxide was still detectable using the starch-iodine test strips. The reaction was stopped and nanotubes were recovered by filtration, washed and dried at 140° C. Recovery was 1.02 g of treated nanotubes. Titration showed an acid equivalence of 0.156 meq.g.

EXAMPLE 14

CC nanotubes (6.0 g, 0.5 gram-atom) were dispersed in 700 cc DI water using a Waring blender, and then further dispersed by ultrasonification. The slurry was then transferred to a three-neck, indented flask equipped with an overhead stirrer, and two dropping funnels. One funnel contained 139 g ferrous sulfate dissolved in 200 cc 1 M $H_2SO_4$. The second funnel contained 103.5 g 30% $H_2O_2$. $H_2SO_4$ (25 g) was added to the nanotube slurry and the flask was submerged in a water bath which was maintained at 10–15° C. The two solutions were then added concurrently at a rate such that 25–30 min were required for total addition of each solution. The combination of hydrogen peroxide with ferrous salts (known as Fenton's reagent) produces hydroxyl radicals (according to the reaction $Fe^{++} + H_2O_2 \rightarrow Fe^{+++} + OH$) which are highly reactive for hydroxylation of carbonaceous substrates.

After reacting for 4 hrs at 10–15° C., peroxide still existed in the reactor at a concentration of about 25 mg/l as determined by starch-iodine test strips. After an additional hour without additional cooling, the reaction temperature increased to 23° C. and the peroxide concentration fell to about 5 mg/l. The reaction was then stopped. The treated nanotubes were recovered by filtration and the nanotubes were washed and dried at 140° C. Recovery was 6.1 g, which gave an acid titer of 0.204 meq/g.

EXAMPLE 15

A stock solution of sodium tungstate co-catalyst was prepared by adjusting a slurry comprising 1.92 g $WO_3$ in 200 cc DI water to about pH 12 with about 2 g NaOH and stirring until a colorless homogenous solution was obtained. Acetic acid was then added to adjust the pH to 5–6. The solution was made up to 300 cc with DI water and stored for further use (labeled 15a).

CC nanotubes (2.4 g, 0.2 gram-atoms) were dispersed in a Waring blender with 300 cc DI water and transferred to a 3-neck, indented reaction flask fitted with an overhead stirrer. Stock co-catalyst solution (15a, 100 cc) was added to the flask with stirring. The flask was heated to 65–70° C., and the dropwise addition of 86 cc of 30% $H_2O_2$ (1 mole, $H_2O_2$) was started. The $H_2O_2/C$ molar ratio was 5.0. Total addition required about 35 min. No temperature increase was observed. Peroxide was still detected after 2 hrs. reaction, but overnight, all peroxide was consumed. Nanotubes were filtered, washed and dried. Recovery was 2.0 g which gave an acid titer of 0.38 meq/g.

The combination of various metallic co-catalysts, such as $SeO_2$, $WO_3$, $MoO_3$, V2O5, $RuO_2$, $OsO_4$, or tungstates, molybdates or permanganates with hydrogen peroxide (see: J. March, *Advanced Organic Chemistry. Reactions, Mechanisms, and Structure*, Third Ed., pp. 732ff, John Wiley & Sons, New York, 1985; H. S. Schultz, et al., *J. Org. Chem*, 28 1963, 1140) are also effective for oxygenating carbonaceous substrates.

EXAMPLE 16

Example 15 was repeated except that 25 cc of the stock co-catalyst solution and 18 cc of 35% $H_2O_2$ (6.84 g $H_2O_2$, 0.2 moles) were employed. The molar ratio of $H_2O_2/C$ was 1.0. After running overnight, a test for remaining peroxide was negative. After filtering, washing and drying, 2.41 g of treated nanotubes were recovered. Titration with standard base gave 0.30 meq/g.

EXAMPLE 17

Treated nanotubes from Examples 15 and 16 (2.4 g) were treated by the procedure described in Example 16. After reaction overnight, 2.26 g of dried fibrils were recovered. Titration gave an acid titer of 0.424 meq/g.

EXAMPLE 18

1000 cc 1M $K_2S_2O_8$/1M $H_2SO_4$ solution were prepared by dissolving 270.33 g $K_2S_2O_8$ (Aldrich) in 1M $H_2SO_4$. 15 g Hyperion CC nanotubes were suspended in 300 cc 1M $K_2S_2O_8$/1M $H_2SO_4$ solution in a 500 cc beaker. The suspension was stirred with a magnetic stirring bar at room temperature for 24 hours. A thick nanotube slurry was formed. The slurry was filtered, washed with deionized water, and dried to yield oxidized nanotubes containing —COOK functional groups.

EXAMPLE 19

1000 cc 1M $K_2S_2O_8$/1M $H_2SO_4$ solution were prepared by dissolving 238.10 g $Na_2S_2O_8$ (Aldrich) in 1M $H_2SO_4$. 15 g Hyperion CC nanotubes were suspended in 300 cc 1M Na₂S₂O₈/1M H₂SO₄ solution in a 500 cc beaker. The suspension was stirred with a magnetic stirring bar at room temperature for 24 hr. A thick nanotube slurry was formed. The slurry was filtered, washed with deionized water, and dried to yield oxidized nanotubes containing —COONa functional groups.

EXAMPLE 20

BN nanotubes (12.0 g, 1 g-at) are treated with 1013 g of 30% acetic acid acid solution of peoxyacetic acid (304 g of peracetic acid, 4.0 mols—COOOH:C mol ratio=4) in a round bottom flask material at 35–40° C. in a water bath. After two hours, the slurry is cooled to room temperature and tested for peroxide with starch-iodine test strips. Indication is negative. The slurry is filtered and washed with several liters of deionized water. A total of 11.5 grams of oxidized nanotubes are recovered after drying at 120° C. Acid titer is 0.12 meq/gram

EXAMPLE 21

CC nanotubes (12.0 g, 1 g-at) are treated with 1840 g of 30% acetic acid solution of peroxybenzoic acid (552 g of peracetic acid, 4.0 mols—COOOH:C mol ratio=4) in a round bottom flask maintained at 35–40° C. in a water bath. After two hours, the slurry is cooled to room temperature and tested for peroxide with starch-iodine test strips. Indication is negative. The slurry is filtered and washed with several liters of deionized water. A total of 11.5 grams of oxidized nanotubes are recovered after drying at 125° C. Acid titer is 0.13 meq/gram.

EXAMPLE 22

BN nanotubes (12.0 g, 1 g-at) are treated with 720 g of 50% aqueous t-butylhydroperoxide (360 g of t-butylhydroperoxide, 4.0 mols—COOOH:C mol ratio=4) dissolved in 1000 g of acetone in a round bottom flask maintained at 35–40° C. in a water bath. After two hours, the slurry is cooled to room temperature and tested for peroxide with starch-iodine test strips. Indication is negative. The slurry is filtered and washed with several liters of deionized water. A total of 11.5 grams of oxidized nanotubes are recovered after drying at 125° C. Acid titer is 0.12 meq/gram.

EXAMPLE 23

CC nanotubes (12.0 g, 1 g-at) are treated with cumene hydroperoxide (608 g of cumene hydroperoxide, 4.0 mols—COOOH:C mol ratio=4) dissolved in 1000 g of acetone in a round bottom flask maintained at 35–40° C. in a water bath. After two hours, the slurry is cooled to room temperature and tested for peroxide with starch-iodine test strips. Indication is negative. The slurry is filtered and washed with several liters of deionized water. A total of 11.5 grams of oxidized nanotubes are recovered after drying at 125° C. Acid titer is 0.13 meq/gram.

EXAMPLE 24

The dispersed nanotubes prepared in Examples 18–22 are used to make electrochemical capacitors by the methods of Examples 7 and 8. Satisfactory results are obtained.

EXAMPLE 25

A weighted sample of CC nanotubes was slurried with 70% nitric acid in a round bottom multi-neck indented flask reactor equipped with an overhead stirrer and a water condenser. With constant stirring, the temperature was adjusted to the reflux point and the reaction carried out for 7 hours. After the reaction, the slurry was poured into de-ionized water, and filtered, and washed with several liters of deionized water until the wash effluent gave no change in pH of deionized water. The oxidized nanotubes were recovered after drying at 125° C. Titration showed an acidic concentration of 0.9 meq/g.

EXAMPLE 26

Surface oxygen content of carbon nanotubes was determined by X-ray photoelectron spectroscopy. The measurement was carried out on a Surface Science Lab SSX-100 spectrometer and summarized in the Table 5.

TABLE 5

| Sample | C (atom %) | O (atom %) |
|---|---|---|
| As-made CC nanotubes | 97.6 | 2.4 |
| Example 10 | 96.2 | 3.8 |
| Example 18 | 96.5 | 3.5 |

The results show that both nitric acid and hydrogen peroxide treated carbon nanotubes exhibited increased surface oxygen content.

EXAMPLE 27

Structural information of surface oxygen species can be illustrated by the XPS high-resolution O1s spectrum. The O1s spectral envelopes of two different batches of oxidized nanotubes (Examples 10 and 25), are shown in FIGS. 1 and 2, respectively. The graphs can be resolved into three peaks representing $H_2O$ (535 eV), C═O (533 eV) and O—H (531 eV). The data show that surface functionality of hydrogen peroxide oxidized nanotubes is dominantly hydroxyl groups in contrast to carboxyl groups on nitric acid oxidized nanotubes.

We claim:

1. A method of chemically modifying carbon nanotubes having a diameter less than one micron comprising: contacting the nanotubes with a peroxygen compound selected from the group consisting of organic peroxyacids, inorganic peroxoacids and organic hydroperoxides, or a salt thereof, under oxidation conditions and thereby producing modified carbon nanotubes, and functionalizing said modified carbon nanotubes with a reactant suitable for adding at least one additional type of functional group to the surface of said nanotubes.

2. A method as recited in claim 1, wherein the diameter of said nanotubes is from 3.5 to 75 nanometers.

3. A method as recited in claim 2, wherein said nanotubes are substantially cylindrical and include a plurality of graphitic layers that are substantially parallel to the axis of said nanotubes and have a length to diameter ratio of greater than 5.

4. A method as recited in claim 2, wherein said carbon nanotubes are substantially free of a continuous pyrolytically deposited carbon overcoat.

5. A method as recited in claim 1 wherein the said additional functional groups are alkyl/aralkyl, hydroxyl, amine, alkyl aryl silanes and fluorocarbon groups having from 1 to 18 carbons.

6. A method as recited in claim 1, wherein the peroxygen compound is selected from the group consisting of: (a) an inorganic peroxoacid; (b) a peroxycarboxylic acid of the formula $Q(C(O)OOH)_n$; (c) a hydroperoxide of the formula $Q(OOH)_n$; (d) salts of (a), (b) or (c), and (e) combinations of any of (a), (b), (c) or (d), wherein Q is an alkyl, aralkyl, cycloalkyl, aryl or heterocyclic group having from 1 to 12 carbon atoms, and n is 1 or 2.

7. A method as recited in claim 6, wherein the inorganic peroxoacid or salt thereof is selected from the group consisting of sodium persulfate, potassium persulfate, ammonium persulfate, ammonium dichromate, potassium dichromate, sodium dichromate, peroxysulfuric acid, potassium peroxymonosulfate, ammoniuni peroxodisulfate, potassium peroxodisulfate and sodium peroxodisulfate.

8. A method as recited in claim 6, wherein the peroxycarboxylic acid is selected from the group consisting of peracetic acid, m-chloroperoxy benzoic acid, magnesium monoperoxyphthalate hexahydrate, performic acid, perbenzoic acid and salts thereof.

9. A method as recited in claim 6, wherein the peroxycarboxylic acid is peracetic acid.

* * * * *